United States Patent [19]
Dupont

[11] Patent Number: 5,106,038
[45] Date of Patent: Apr. 21, 1992

[54] FREIGHT FEEDER AIRCRAFT AND METHOD OF TRANSPORTING CARGO USING SAME

[75] Inventor: John J. Dupont, McLean, Va.

[73] Assignee: American Utilicraft Corporation, Reston, Va.

[21] Appl. No.: 658,269

[22] Filed: Feb. 20, 1991

[51] Int. Cl.$^5$ .......................... B64C 1/22; B64D 9/00
[52] U.S. Cl. ................................ 244/137.1; 244/118.1
[58] Field of Search ............... 244/137.1, 118.1, 118.3, 244/137.3

[56] References Cited

U.S. PATENT DOCUMENTS

| | | | |
|---|---|---|---|
| 2,498,819 | 2/1950 | Noville | 244/137.1 |
| 3,065,934 | 11/1962 | Jackson | 244/137.1 |
| 3,128,068 | 4/1964 | Pauli | 244/137.1 |
| 3,958,165 | 5/1976 | Boy de la Tour | 244/137.1 |
| 4,006,869 | 2/1977 | Vogele | 244/137.3 |
| 4,097,009 | 6/1978 | Barnes | 244/137.1 |
| 4,218,034 | 8/1980 | Magill | 244/137.1 |
| 4,225,926 | 9/1980 | Wendt | 244/137.3 |

FOREIGN PATENT DOCUMENTS

| | | | |
|---|---|---|---|
| 1277675 | 9/1968 | Fed. Rep. of Germany | 244/137.1 |
| 2026974 | 12/1971 | Fed. Rep. of Germany | 244/137.1 |
| 3130516 | 2/1983 | Fed. Rep. of Germany | 244/118.1 |
| 858596 | 1/1961 | United Kingdom | 244/118.1 |
| 876150 | 8/1961 | United Kingdom | 244/137.1 |
| 900466 | 7/1962 | United Kingdom | 244/137.1 |
| 913783 | 12/1962 | United Kingdom | 244/137.1 |

OTHER PUBLICATIONS

Fairchild Aircraft, *The Inside Story of the Fairchild Packet*, 2-1947.
Koehler Aerospace, Aviation Magazine; Feb. 1980.

*Primary Examiner*—Joseph F. Peters, Jr.
*Assistant Examiner*—Anne E. Bidwell
*Attorney, Agent, or Firm*—Rothwell, Figg, Ernst & Kurz

[57] ABSTRACT

A freight feeder aircraft and method of transporting containerized cargo using the same includes a cargo container access door opening located at the fore portion of the aircraft fuselage and dimensioned to accommodate standardized cargo containers such as LD-3 containers. A load bearing cargo access ramp is located at the aft portion of the fuselage and opens downwardly to provide a ramp for unloading cargo containers to the ground. The interior of the fuselage includes an elongated, unobstructed cargo compartment which is configured to accommodate a number of standardized cargo containers. Substantially simultaneous loading and unloading of cargo containers is achieved to thereby substantially reduce the time required for cargo on-load and off-load between aircraft landing and subsequent takeoff.

18 Claims, 5 Drawing Sheets

FREIGHT FEEDER AIRCRAFT AND METHOD OF TRANSPORTING CARGO USING SAME

BACKGROUND OF THE INVENTION

1. Field of the Invention

The present invention relates generally to aircraft, and more specifically to freight feeder aircraft for short-haul air transportation of containerized cargo from originating locations to a central point where the cargo may be efficiently reloaded onto large size aircraft for long-haul transportation to another central reloading point or to a final destination. The invention also relates to a method of transporting cargo using such a freight feeder aircraft.

2. Background and Prior Art

Cargo carrying aircraft are known in the art. Typically, such aircraft are for long-haul operations, are of very large size, require long runways for takeoff and landing, and are inefficient and uneconomical for short-haul operations. Loading and unloading cargo from such aircraft is particularly inefficient and requires a significant amount of time, thus undesirably increasing the "turn around" time from landing and unloading to reloading for another takeoff.

An example of a known cargo carrying aircraft is shown in Watter U.S. Pat. No. 2,425,498.

Power lifted aircraft, in the form of helicopters, have also been known for many years and used for air transportation of cargo. While such aircraft have many advantages over conventional aircraft, which typically require runways of a minimum specified length for takeoff and landing, helicopters are incapable of fulfilling the rapidly developing needs of the commercial and military air cargo transportation systems as a result of the operational and economic limitations of such aircraft.

As such, a new type of aircraft is needed to fill the needs of the short haul freight industries, such as the overnight express package delivery industry, as well as the increasingly containerized freight transportation systems of the military services. Additionally, there is a need for a special aircraft which can perform short haul freight feeder operations from origination points to major hubs of the large passenger airlines, thereby supplementing revenues of such airlines by filling the containerized cargo areas in the bellies of their large passenger aircraft. Still further, there is an increasing need for the air transportation of containerized cargo to and from remote locations not accessible by large aircraft, such as in many developing Third World countries.

SUMMARY OF THE INVENTION

The present invention provides, in one preferred embodiment thereof, a fixed-wing freight feeder aircraft and a method of transporting cargo which solves the above noted problems and fulfills the existing needs of the commercial and military freight transportation systems.

The present invention provides, in one preferred embodiment thereof, an aircraft having in the fuselage thereof an unobstructed constant contour cargo compartment extending fore and aft within said fuselage, having at the forward portion of said fuselage a container access door opening dimensioned to pass therethrough and into the fore portion of said cargo compartment standardized cargo containers holding freight, and having at the rear aft portion of said fuselage a load bearing cargo access door opening downwardly from said fuselage to contact the ground and thereby providing a downwardly sloping ramp from the aft portion of said cargo compartment to the ground.

The present invention also provides a method of transporting freight by air, comprising the steps of providing an aircraft having in the fuselage thereof an elongated cargo compartment extending fore and aft within said fuselage, having at the forward portion of said fuselage a container access door opening dimensioned to pass therethrough and into the fore portion of said cargo compartment standardized cargo containers holding freight, and having at the rear aft portion of said fuselage a load bearing cargo access door opening downwardly from said fuselage to contact the ground and thereby providing a downwardly sloping ramp from the aft portion of said cargo compartment to the ground, sequentially presenting standardized cargo containers holding freight and bound for a ground destination at said access door opening and loading said standardized cargo containers into said fore portion of said cargo compartment through said access door opening, sequentially moving said standardized cargo containers from the fore portion of said cargo compartment rearwardly toward said aft portion of said cargo compartment, transporting the standardized cargo containers so loaded within said cargo compartment via air to said ground destination, opening said load bearing cargo access door to provide said ramp to the ground, and sequentially unloading said standardized cargo containers from said cargo compartment to the ground by sequentially moving said standardized cargo containers toward said load bearing cargo access door within said cargo compartment and along the surface of said load bearing cargo access door down to the ground.

Additionally, the aircraft of the present invention can be configured for power-lifted Short Takeoff and Landing (STOL) operation which is suited to very short runways.

DETAILED DESCRIPTION OF THE PREFERRED EMBODIMENTS

The aircraft according to one embodiment of the invention is a twin-engine, turbo-prop, high wing, fixed gear, unpressurized aircraft, having an elongated unobstructed constant contour cargo compartment in the fuselage thereof. The cargo compartment is configured to accommodate up to four industry standard LD-3 size containers, which are presently used by the major airlines to hold baggage, mail, and cargo for transportation within the bellies of large passenger aircraft.

Figure 1:
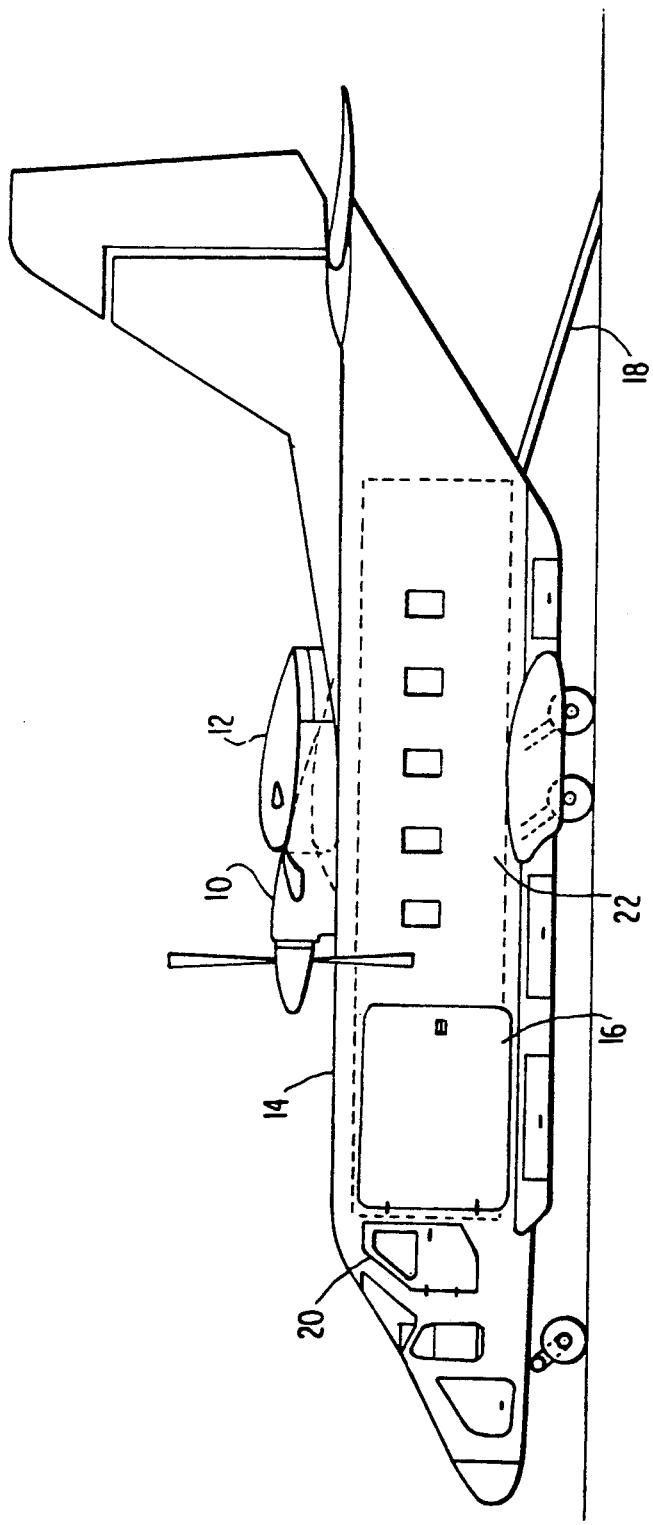
FIG. 1 is a side elevational view of a freight aircraft according to one preferred embodiment of the invention.
Figure 2:
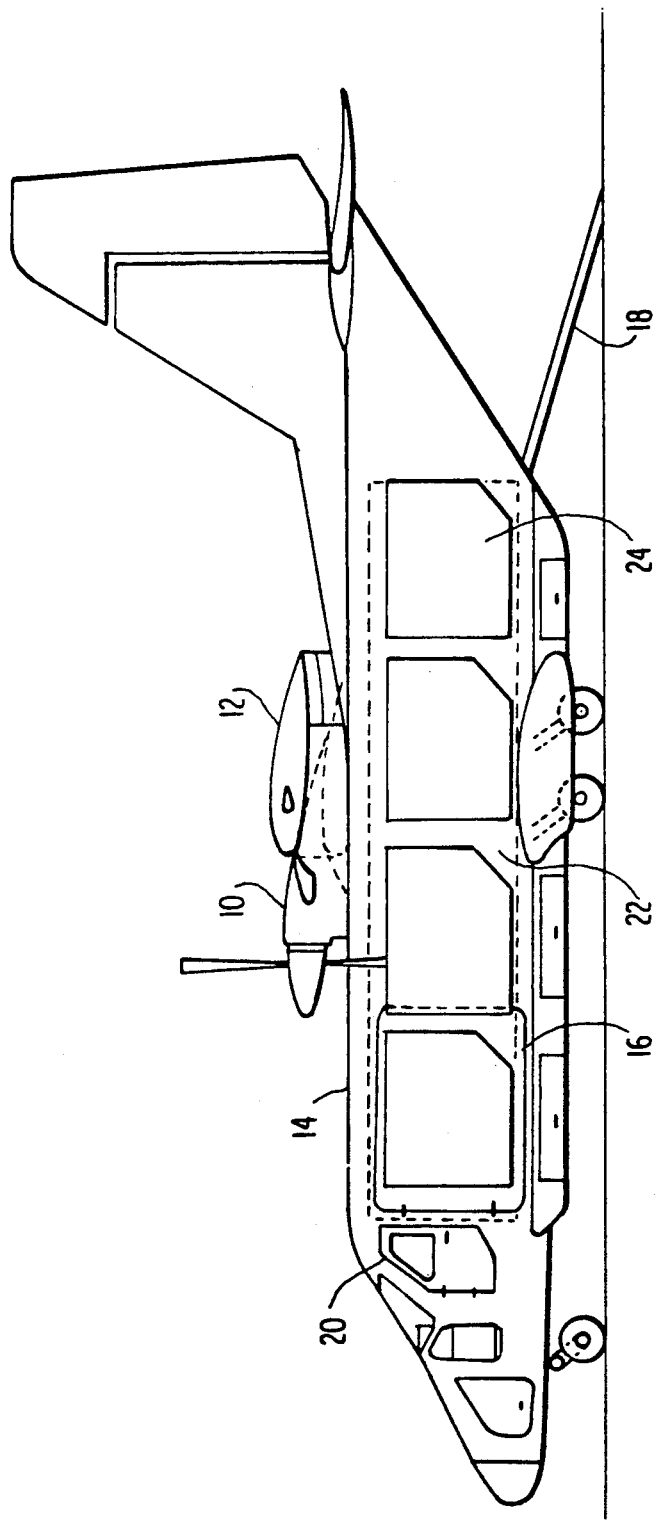
FIG. 2 is a ghost side elevational view of the aircraft of FIG. 1 showing the storage of a plurality of standardized cargo containers in the fuselage thereof.
Figure 3:
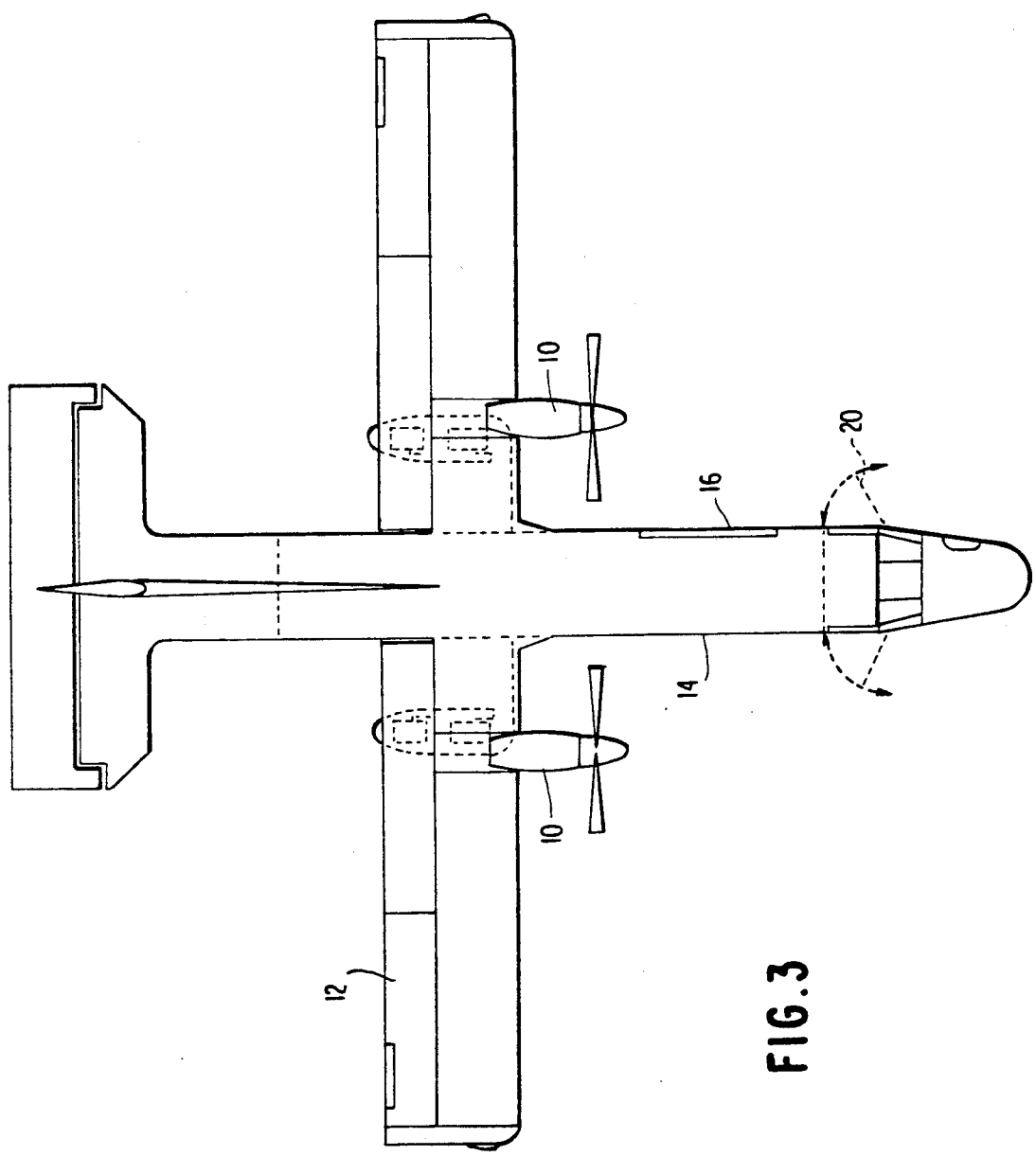
FIG. 3 is a top plan view of the aircraft of FIG. 1.

Referring to FIGS. 1-3, twin turboprop engines 10 are mounted on the high wing 12 of the aircraft, above the fuselage 14. The combination of the high wing and engine mounting configuration lends itself to power-lifted STOL operation through the use of engine exhaust channeling over the wing surface to achieve laminar flow and thus increased lift.

The fuselage includes a pair of cockpit access doors 20 which open to the cockpit of the aircraft which can accommodate a crew of two.

Within the fuselage 14 is a cargo compartment 22 which extends fore and aft within the fuselage 14, and which is dimensioned to accommodate a plurality of standardized cargo containers 24, such as the industry standard LD-3 container. At the left side forward portion of the fuselage, a cargo access door opening 16 is provided, which is dimensioned to allow the standardized cargo containers 24 to pass therethrough and into the forward portion of the cargo compartment 22. The cargo access door opening 16 is closed by an access door when the aircraft is in flight.

The aft portion of the fuselage includes a load bearing on load/off load ramp 18 which opens to form a downwardly sloping ramp over which the containers 24 may be off-loaded to the ground. The load bearing ramp 18 may also be lowered and fixed or supported at intermediate positions above the ground level for direct loading into the rear of a cargo vehicle or to a fixed terminal cargo handling system.

Figure 4:
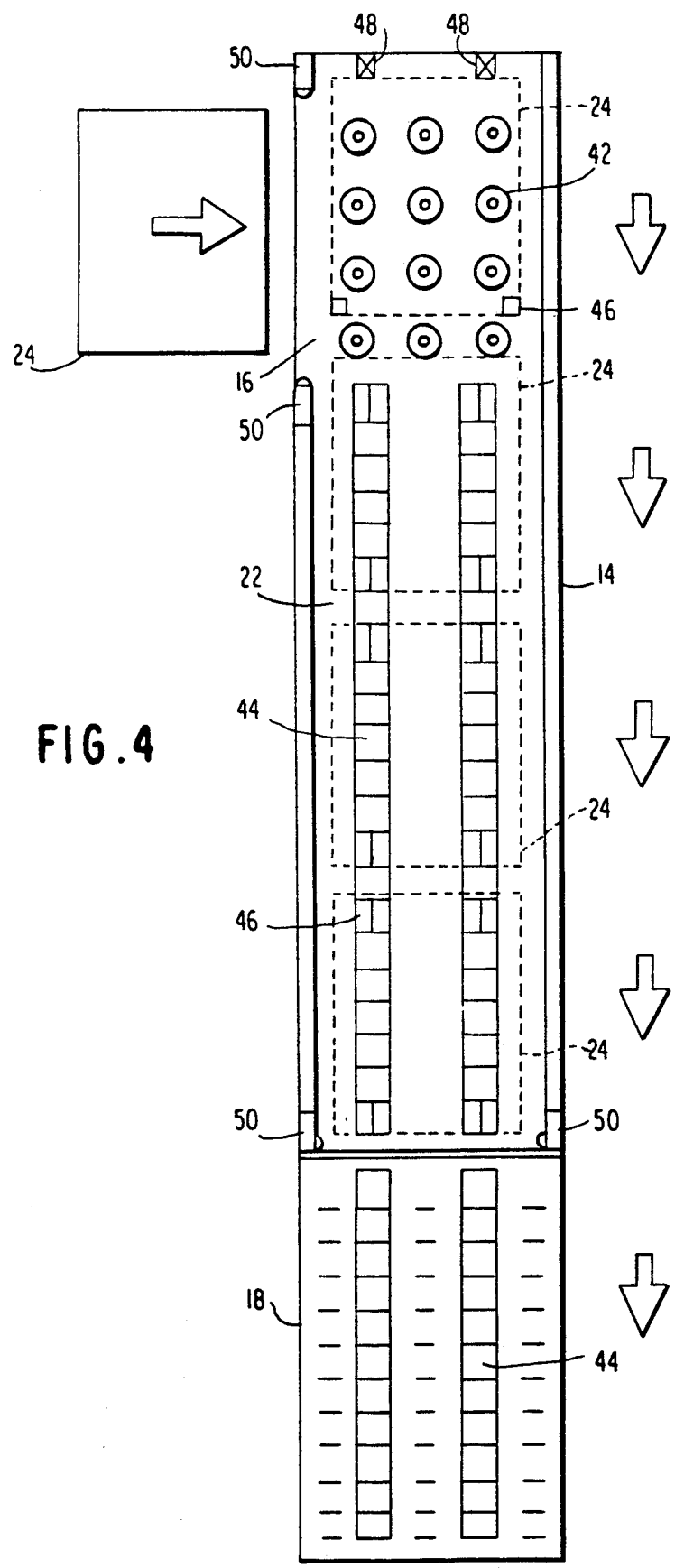
FIG. 4 is a cutaway top view of the interior of cargo compartment 22 of FIGS. 1 and 2.

The interior floor of cargo compartment 22 may include a cargo container handling and transport system for facilitating the movement of containers 24 from the fore section of the compartment 22 to the aft section thereof, as shown in FIG. 4. Specifically, a container 24 is loaded into the cargo compartment 22 and onto a plurality of omnidirectional ball bearings 42 which are permanently set into the cargo floor. The plurality of ball bearings form a ball mat which provides for rolling movement of the cargo containers 24 as they are loaded into the cargo compartment through access door opening 16, and also provides for rolling movement of the containers 24 as they are moved toward the aft portion of the cargo compartment. Movement of the containers 24 along the length of the cargo compartment 22 is facilitated by a plurality of rollers 44 recessed into the cargo floor. The rollers 44 rotate in place to allow the containers 24 to be easily moved within the cargo compartment and toward the ramp 18 for unloading. Ramp 18 may also have rollers 44 recessed into the surface thereof. A number of bumper restraints 48 are provided at the forward end of the cargo compartment to prevent the containers from colliding into the end wall of the cargo compartment. In addition, container restraint/locking mechanisms 46 are provided within the cargo floor which may be withdrawn from their recess spaces to engage the bottom or sides of the containers to keep the containers securely in place while the aircraft is in motion.

While a specific cargo container handling system including omnidirectional ball bearings and recessed rollers has been shown and described in FIG. 4, the container handling system may be implemented by any one of a number of known handling systems using skids, shuttle assemblies or conveyor belts. One such alternative system is shown in McDonnell Douglas Corporation U.S. Pat. No. 3,522,919.

The turnaround time for unloading and reloading of cargo is significantly reduced according to the aircraft and method of cargo transport using the aircraft, according to the invention.

In operation, containers 24 are sequentially presented at the cargo access door opening 16, through the use of any conventionally known cargo lifting system, where they are passed therethrough and loaded into the fore portion of the cargo compartment 22. The thus loaded containers 24 are then moved by the handling system 42, 44 toward the rear or aft portion of compartment 22.

At the destination point, the load bearing access ramp 18 is opened to provide a ramp extending to the ground, to a cargo vehicle, or to a fixed terminal cargo transporting system, and the containers 24 are then sequentially downloaded over the surface of the ramp 24 with the aid of the handling system rollers 44 and the force of gravity.

At busy commercial air terminals or in military operations, it is desirable to load and unload freight as quickly as possible to minimize delays and improve the efficiency of operation. Such is achieved according to the present invention by virtue of the provision of the cargo access door 16 located at the forward section of the cargo compartment. This configuration allows substantially simultaneous loading and unloading of standardized cargo containers into and out of the cargo compartment of the aircraft.

Specifically, as containers 24 are sequentially moved toward the aft section of the compartment 22 and down the ramp 18, additional containers 24 bound for the next ground destination simultaneously can be sequentially loaded into the fore section of cargo compartment 22 through access door opening 16 to occupy the space created by the unloading of the last container, and movement rearwardly through the cargo compartment 22 of the remaining cargo containers to be unloaded. In this way, the aircraft may immediately prepare for take-off to the next ground destination as soon as the last container 24 has been unloaded through the ramp 18, with the final container to be transported being simultaneously loaded through the access door 16.

In order to improve the efficiency of cargo container management, each container may be provided with bar code identification labels. A plurality of bar code readers 50 may then be provided at the container ingress and egress points of the compartment 22, for example, adjacent the access door opening 16 and the end of the ramp 18, to automatically read the identifying information on the bar code to thus automatically keep track of the identity of each container that is loaded and unloaded from the compartment 18. The bar code readers 50 may transmit this data to an on-board data storage device which in turn may download the data to a management center processing system for processing. In such manner, the need for management personnel to be present during onloading and offloading operations can be obviated. The bar code scanners may be implemented by any of a number of bar code scanning systems currently available. One example of such a system is the Model 30 Bar Code Scanner and Model 9000 Bar Code Decoder and Logic, manufactured by Accu-Sort Systems, Inc., Telford, Pa. However, any other equivalent bar code scanning system may be used to achieve the same result.

Figure 5:
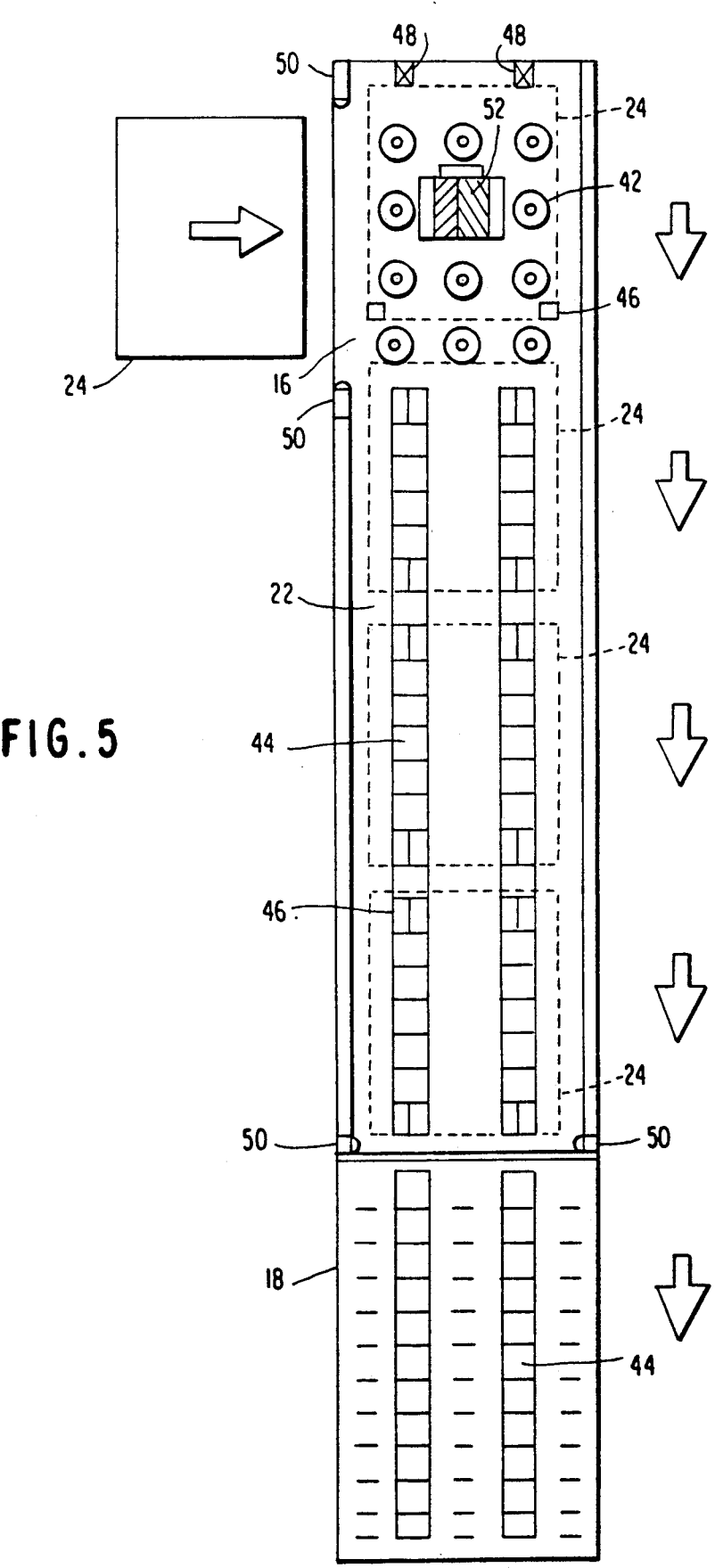
FIG. 5 is a cutaway top view of the interior of cargo compartment 22 of another embodiment of the invention including a container weighing mechanism 52.

In a second embodiment of the invention as shown in FIG. 5, a container weighing mechanism or scale 52 is provided in the floor of cargo compartment 22 at the forward section thereof, for automatically weighing each container 24 as it is loaded into the cargo compartment area. In a preferred embodiment, the scale 52 is an electronic scale which automatically transmits the weight of each container to an on-board data storage device where it is correlated with the container-identifying information read by the bar code readers 50. Such electronic scales are known in the art and are commercially available. One example of such a scale is the Load Ranger, manufactured by Measurement Systems International, Seattle, Wash. However, any other equivalent commercially available weighing device may be used in this embodiment to achieve the same result.

The aircraft and method of cargo transport using the aircraft of the present invention thus addresses an important and heretofore unfulfilled need in the transportation of commercial and military containerized freight worldwide.

It should be noted that although the preferred method has been described as onloading through side access door 16 and offloading through the ramp 18, it is also possible to onload the cargo containers through the ramp 18 and to offload the cargo containers through the access door opening 16.

The invention having been thus described, it will be obvious to those skilled in the art that the same may be varied in many ways without departing from the spirit and scope of the invention. Any and all such modifications are intended to be included within the scope of the following claims.

What is claimed is:

1. A method of transporting freight by air, comprising the steps of:
    a) providing an aircraft having in the fuselage thereof an elongated cargo compartment extending fore and aft within said fuselage, having at the forward portion of said fuselage at one side thereof, a container access door opening specifically dimensioned to pass therethrough and into the fore portion of said cargo compartment standardized cargo containers holding freight, and having at the rear aft portion of said fuselage a load bearing cargo access ramp opening downwardly from said fuselage to contact an unloading surface and thereby providing a downwardly sloping ramp from the aft portion of said cargo compartment to said unloading surface, said load bearing cargo access ramp being specifically dimensioned to accommodate said standardized cargo containers holding freight;
    b) sequentially presenting standardized cargo containers holding freight and bound for a ground destination at said access door opening and loading said standardized cargo containers into said fore portion of said cargo compartment through said access door opening in a direction perpendicular to a longitudinal axis of said fuselage;
    c) sequentially moving said standardized cargo containers from the fore portion of said cargo compartment rearwardly toward said aft portion of said cargo compartment;
    d) transporting the standardized cargo containers so loaded within said cargo compartment via air to said ground destination;
    e) opening said load bearing cargo access ramp to provide said ramp to said unloading surface; and
    f) sequentially unloading said standardized cargo containers from said cargo compartment to said unloading surface by sequentially moving said standardized cargo containers toward said load bearing cargo access ramp within said cargo compartment and along the surface of said load bearing cargo access ramp down to said unloading surface.

2. A method of transporting freight by air according to claim 1, further comprising the step of:
    g) performing steps b) and c) simultaneously with the performance of step f) at said ground destination to thereby load standardized cargo containers bound for a different ground destination into said cargo compartment simultaneously with the unloading of said loaded standardized cargo containers.

3. A method of transporting freight by air according to claim 2, wherein said access door opening is dimensioned to pass standardized cargo containers of size LD-3 therethrough.

4. A method of transporting freight by air according to claim 1, wherein said unloading surface is the ground.

5. A method of transporting freight by air according to claim 1, wherein step b) includes the additional step of automatically reading identification information from each container as it is loaded into the fore portion of said cargo compartment.

6. A method of transporting freight by air according to claim 1, wherein step b) includes the additional step of automatically weighing each container as it is loaded into the fore portion of said cargo compartment.

7. A method of transporting freight by air according to claim 1, wherein said access door opening is dimensioned to pass standardized cargo containers of size LD-3 therethrough.

8. A method of transporting freight by air, comprising the steps of:
    a) providing an aircraft having in the fuselage thereof an elongated cargo compartment extending fore and aft within said fuselage, having at the forward portion of said fuselage at one side thereof a container access door opening specifically dimensioned to pass therethrough and out of the fore portion of said cargo compartment standardized cargo containers holding freight, and having at the rear aft portion of said fuselage a load bearing cargo access ramp opening downwardly from said fuselage to contact a loading surface and thereby providing a downwardly sloping ramp from the aft portion of said cargo compartment to said loading surface, said load bearing cargo access ramp being specifically dimensioned to accommodate said standardized cargo containers holding freight;
    b) sequentially presenting standardized cargo containers holding freight and bound for a ground destination at said loading surface and loading said standardized cargo containers into said aft portion of said cargo compartment along the surface of said load bearing cargo access ramp;
    c) sequentially moving said standardized cargo containers from the aft portion of said cargo compartment forwardly toward said fore portion of said cargo compartment;
    d) transporting the standardized cargo containers so loaded within said cargo compartment via air to said ground destination;
    e) opening said container access door opening to provide access to said cargo compartment; and
    f) sequentially unloading said standardized cargo containers from said cargo compartment by sequentially moving said standardized cargo containers toward said container access door opening within said cargo compartment and out of said cargo compartment through said container access door opening in a direction perpendicular to a longitudinal axis of said fuselage.

9. A method of transporting freight by air according to claim 8, further comprising the step of:
  g) performing steps b) and c) simultaneously with the performance of step f) at said ground destination to thereby load standardized cargo containers bound for a different ground destination into said cargo compartment simultaneously with the unloading of said loaded standardized cargo containers.

10. A method of transporting freight by air according to claim 9, wherein said access door opening is dimensioned to pass standardized cargo containers of size LD-3 therethrough.

11. A method of transporting freight by air according to claim 8, wherein said unloading surface is the ground.

12. A method of transporting freight by air according to claim 8, wherein step b) includes the additional step of automatically reading identification information from each container as it is loaded into the aft portion of said cargo compartment.

13. A method of transporting freight by air according to claim 8, wherein said access door opening is dimensioned to pass standardized cargo containers of size LD-3 therethrough.

14. An aircraft, comprising:
  an elongated cargo compartment extending fore and aft within the fuselage thereof;
  a container access door opening located at one side of the fore portion of said cargo compartment specifically dimensioned to pass therethrough and into the fore portion of said cargo compartment standardized cargo containers holding freight in a direction perpendicular to a longitudinal axis of said fuselage;
  a load bearing cargo access ramp at the aft portion of said cargo compartment opening downwardly from said fuselage to contact an unloading surface and thereby providing a downwardly sloping ramp from the aft portion of said cargo compartment to said unloading surface, said load bearing cargo access ramp being specifically dimensioned to accommodate said standardized cargo containers holding freight; and
  means provided in the floor of said cargo compartment for facilitating movement of said standardized cargo containers within said cargo compartment.

15. An aircraft according to claim 14, wherein said access door opening is dimensioned to pass standardized cargo containers of size LD-3 therethrough.

16. An aircraft according to claim 14, further comprising means for automatically reading identification information from each container as it is loaded into and unloaded from said cargo compartment.

17. An aircraft according to claim 14, further comprising means for automatically weighing each container as it is loaded into said cargo compartment.

18. An aircraft according to claim 14, wherein said unloading surface is the ground.

* * * * *